United States Patent [19]
Baak

[11] 3,942,991

[45] Mar. 9, 1976

[54] $SiO_2$-$AlPO_4$ GLASS BATCH COMPOSITIONS

[75] Inventor: Nils Tryggve E. A. Baak, Ridgefield, Conn.

[73] Assignee: Owens-Illinois, Inc., Toledo, Ohio

[22] Filed: Oct. 3, 1969

[21] Appl. No.: 863,697

Related U.S. Application Data

[63] Continuation-in-part of Ser. No. 465,739, June 21, 1965, abandoned.

[52] U.S. Cl. .................................. 106/52; 106/54
[51] Int. Cl.$^2$ ...................... C03C 3/06; C03C 3/08
[58] Field of Search ......... 106/52, 54, 49, 47 Q, 65, 106/69

[56] References Cited
UNITED STATES PATENTS

| | | | |
|---|---|---|---|
| 1,607,817 | 11/1926 | Dennis | 106/47 |
| 2,061,892 | 11/1936 | Burns | 106/52 |
| 2,326,059 | 8/1943 | Nordberg | 106/52 |
| 2,355,746 | 8/1944 | Nordberg | 106/52 |
| 2,608,490 | 8/1952 | Donahey | 106/48 |
| 3,275,492 | 9/1966 | Herbert | 106/52 |
| 3,451,829 | 6/1969 | Bromer et al. | 106/47 Q |
| 3,528,829 | 9/1970 | Baak et al. | 106/52 |
| 3,549,394 | 12/1970 | Perrotta | 106/39 DV |

FOREIGN PATENTS OR APPLICATIONS

| | | | |
|---|---|---|---|
| 989,078 | 4/1965 | United Kingdom | 106/52 |
| 635,391 | 11/1963 | Belgium | 106/39 |
| 1,028,872 | 5/1966 | United Kingdom | 106/54 |

OTHER PUBLICATIONS

Kingery, W. D., *Introduction to Ceramics*, New York, 1960 pp. 473–476.

Syritskaya et al., *Latvisas PSR Zinatnu (Kimijas Serisa)* 1964, [4] pp. 411–418.

Robinson et al., ... *System $SiO_2$–$Al_2O_3$–$P_2O_5$*, in *Journ. Amer. Cer. Soc.*, 47[11] pp. 587–592.

Tien, T. Y., et al., *The System $SiO_2$–$P_2O_5$*, in *Journ. Amer. Cer. Soc.*, 45[9] pp. 422–424.

Kingery, W. D., *Introduction to Ceramics*, New York 1960 pp. 473–474.

Florke, O. W., *The Structures of $AlPO_4$+$SiO_2$*, in *Science of Ceramics*, Vol. 3, New York, 1967 pp. 13–27.

Kobayashi, T, *Solid Solution Between $SiO_2$+$AlPO_4$ With Cristobalite Structure*, Japan, 1964, in *Chem. Abst.*, 65, 1966.

*Primary Examiner*—Helen M. McCarthy
*Attorney, Agent, or Firm*—Richard B. Dence; E. J. Holler

[57] ABSTRACT

Glass batch compositions for producing low to medium expansion glasses having linear coefficients of thermal expansion in the range of from about $4.1 \times 10^{-7}$ to about $19.0 \times 10^{-7}$ in./in./°C. over a temperature range from 0°–300°C. The glass batch compositions are capable of being melted at a temperature of about 1600°C. and are composed essentially of a finely divided admixture of 70-87 mole percent $SiO_2$ and 1.0–10 mole percent $AlPO_4$ together with 0-21 mole percent of at least one $RO_2$ oxide selected from the group consisting of from 0–14 mole percent $TiO_2$ and 0–10 mole percent $GeO_2$. The total mole percent of $SiO_2$ and $AlPO_4$ preferably constitute at least 79 mole percent of the total glass batch composition.

13 Claims, No Drawings

SIO$_2$-AlPO$_4$ GLASS BATCH COMPOSITIONS

CROSS-REFERENCE TO RELATED APPLICATIONS

The present invention is a continuation-in-part of copending application Ser. No. 465,739, filed June 21, 1965, now abandoned.

BACKGROUND OF THE INVENTION

In the art of glass making, comparatively few glass compositions are known which exhibit linear coefficients of thermal expansion and contraction in the low to medium expansion and contraction range of from about $4 \times 10^{-7}$ to $20 \times 10^{-7}$ in./in./°C. over the temperature range from 0° to 300°C. Moreover, such glass compositions as are known to exhibit desired low to medium expansion and contraction properties characteristically have been produced either from glass batch compositions which require the employment of exceedingly high glass batch melting temperatures or from glass batch compositions which are unsuitable for conventional glass batch melting techniques and require resort to expensive and complicated processing techniques such as vapor phase reactions. In either instance, however, production capabilities are so extremely limited and processing costs are so expensive that such previously known glass compositions generally have been regarded as being outside the realm of practicability for commercial production of moderate cost glasses and, in consequence, practical commercial applications of such glasses have been quite limited.

SUMMARY OF THE INVENTION

The present invention pertains generally to glass batch compositions which are especially suitable for producing glasses possessing low to medium linear coefficients of thermal expansion and contraction, and more particularly to glass batch compositions for producing glasses based primarily upon silica and aluminum phosphate and in a more preferrable aspect modified by the inclusion of at least one oxide selected from the RO$_2$ group of oxides consisting of titanium dioxide and germanium dioxide.

Accordingly, it is an object of the present invention to provide glass batch compositions that have desirable properties and characteristics.

It is a further object of the present invention to provide SiO$_2$-AlPO$_4$ glass batch compositions that are productive of glasses exhibiting low to medium coefficients of thermal expansion.

It is a further object of the present invention to provide SiO$_2$-AlPO$_4$ glass batch compositions that have melting temperatures below that of silica.

It is a further object of the present invention to provide SiO$_2$-AlPO$_4$ glass batch compositions that have desirable properties and overcome the problems which have been encountered in the past.

It is a further object of the present invention to provide glass batch compositions that are productive of glasses having desirable properties which make them suitable for a wide variety of uses.

In attaining the above objects, one feature of the present invention resides in providing relatively low melting temperature glass batch compositions that are primarily based on silica and aluminum phosphate.

According to one broad aspect of the present invention, the glass batch compositions are modified by incorporating therein at least one of the RO$_2$ oxides selected from the group consisting of titanium dioxide and germanium dioxide.

In a more limited aspect, the present invention provides glass batch compositions containing a finely divided admixture consisting primarily of from 70 to 87 mole percent SiO$_2$, from 1.0 to 10 mole percent AlPO$_4$, 0.1–21 mole percent of at least one RO$_2$ oxide selected from the group consisting of from 0 to 14 mole percent TiO$_2$ and from 0 to 10 mole percent GeO$_2$.

In accordance with another more limited aspect, the present invention provides glass batch compositions consisting essentially of 70–87 mole percent of SiO$_2$, 1.0–10 mole percent of AlPO$_4$, 0.1–21 mole percent of at least one RO$_2$ oxide selected from the group consisting of from 0–14 mole percent TiO$_2$ and from 0–10 mole percent GeO$_2$, together with from 0–10 mole percent of other compatible glass forming batch constituents selected from the group consisting of ZrO$_2$, P$_2$O$_5$, V$_2$O$_5$, CdO, B$_2$O$_3$, CuO, rare earths and other transition elements.

In another aspect of the invention, glass batch compositions are provided containing finely comminuted admixtures of from 70 to 87 mole percent SiO$_2$, 1.0 to 10.0 mole percent AlPO$_4$, 0–10 mole percent P$_2$O$_5$, 0 to 14.0 mole percent TiO$_2$ and 0 to 10 mole percent GeO$_2$, wherein the sum of AlPO$_4$ plus P$_2$O$_5$ is at least 5.0 mole percent and the sum of AlPO$_4$ plus TiO$_2$ is at least 5.0 mole percent and the sum of SiO$_2$ plus TiO$_2$ is at least 80 mole percent.

A still further aspect of the present invention is directed to the provision of glass batch compositions composed essentially of finely divided admixtures of SiO$_2$, AlPO$_4$ and TiO$_2$ and where the SiO$_2$ is present in an amount of 70 to 87 mole percent, the AlPO$_4$ is present in an amount of 5.0 to 10.0 mole percent, and the TiO$_2$ is present in an amount from 2.0 to 10.0 mole percent of the total batch composition.

Additionally, another aspect of the present invention embodies providing glass batch compositions composed essentially of finely divided admixtures of SiO$_2$, AlPO$_4$ and GeO$_2$, wherein SiO$_2$ is present in an amount of 70 to 87 mole percent, AlPO$_4$ is present in an amount of 1 to 10.0 mole percent, and GeO$_2$ is present in an amount up to 10.0 mole percent.

Other objects, aspects, features and advantages of the present invention will become readily apparent from the following detailed description thereof.

DETAILED DESCRIPTION OF THE INVENTION

The glass batch compositions of the present invention in addition to being capable of being melted at relatively low temperatures such as 1600°–1700°C., or less, are especially suitable for the formation of glasses possessing desirable characteristics of thermal expansion and contraction in the low to medium range of $4 \times 10^{-7}$ to $20 \times ^{-7}$ in./in./°C. over a temperature range of 0°–300°C.. By virtue of the desirable coefficients of expansion and contraction which are possessed by the glasses resulting from the glass batch compositions of the present invention, the resulting glasses have many practical uses in the fabrication of laboratory equipment and instrumentation as well as in the fabrication of optical devices, astronomical mirrors and the like.

Representative glass batch compositions described herein are productive of glasses exhibiting linear coefficients of thermal expansion which have been observed to range from $4.1 \times 10^{-7}$ to about $19.0 \times 10^{-7}$ over the temperature range from 0°–300°C.. Of course, this range of thermal expansion should not be considered as necessarily inclusive of all coefficients obtainable from the glasses produced from the glass batch compositions of the present invention. However, such an expansion range is an extremely desirable range and for that reason the glass batch compositions of the present invention are important for producing glasses having a wide variety of applications.

According to the present invention, glass batch compositions are provided which contain silica and aluminum phosphate together with at least one $RO_2$ oxide selected from the group consisting of $TiO_2$ and $GeO_2$; the components being present in the glass batch composition in the following indicated mole percent ranges based on the total compositions:

| COMPONENT | MOLE PERCENT |
| --- | --- |
| $SiO_2$ | 70–87 |
| $AlPO_4$ | 1.0 to 10 |
| $TiO_2$ | 0 to 14 |
| $GeO_2$ | 0 to 10 |

In a preferred aspect of the above composition, the sum of $SiO_2$ plus $AlPO_4$ is equal to at least 79 mole percent.

According to a further aspect of the present invention, glass batch compositions are provided which are based on the system $SiO_2$-$AlPO_4$-$TiO_2$-$GeO_2$ wherein the composition consists essentially of the following glass batch components in the indicated mole percent ranges based on the total composition:

| COMPONENT | MOLE PERCENT |
| --- | --- |
| $SiO_2$ | 70–87 |
| $AlPO_4$ | 1.0 to 10 |
| $TiO_2$ | 4 to 14 |
| $GeO_2$ | up to 10 |

Preferred batch compositions are those wherein the sum of $SiO_2$ plus $AlPO_4$ is at least 80.0 mole percent of the total glass batch composition.

Included in the glass batch compositions described hereinabove are those having the following composition, the batch components being present in the indicated mole percent ranges based on the total glass batch composition:

| COMPONENT | MOLE PERCENT |
| --- | --- |
| $SiO_2$ | 75 – 85 |
| $AlPO_4$ | 4.9 to 10 |
| $TiO_2$ | 5 to 14 |
| $GeO_2$ | 1 to 10 |

In addition to the phosphate available in the $AlPO_4$, additional phosphate may be added as $P_2O_5$ and therefore the present invention includes glass batch compositions of the formulation:

| COMPONENT | MOLE PERCENT |
| --- | --- |
| $SiO_2$ | 70–87 |
| $AlPO_4$ | 1 – 10 |
| $TiO_2$ | 0 – 14 |
| $GeO_2$ | 0 – 10 |
| $P_2O_5$ | 0 – 10 |

Small amounts, i.e. up to 2–3 mole percent, of other batch materials may be added, such as boron nitride, alkali and alkaline earths, rare earths, transition metals, alumina, and the like, provided such additions to the glass batch do not disturb or adversely affect the final product.

A particularly suitable batch composition coming within the scope of the glass batch compositions of the present invention contains at least four of the following batch components in the indicated mole percent ranges based on the total batch composition:

| COMPONENT | MOLE PERCENT |
| --- | --- |
| $SiO_2$ | 75 – 85 |
| $AlPO_4$ | 4.9 to 10 |
| $TiO_2$ | 5 to 10 |
| $P_2O_5$ | 0 to 5 |
| $B_2O_3$ | 0 to 5 |

Preferably both $P_2O_5$ and $B_2O_3$ are present in a minimum of 2.5 mole percent.

A further glass batch composition that has been found to be particularly suitable, according to the present invention, contains at least four of the following components in the indicated mole percent ranges, based on the total batch composition:

| COMPONENT | MOLE PERCENT |
| --- | --- |
| $SiO_2$ | 75–80 |
| $AlPO_4$ | 1–10 |
| $TiO_2$ | 0–10 |
| $B_2O_3$ | 2.5–5 |
| $P_2O_5$ | 2.5–5 |

Further preferred glass batch compositions of the present invention are shown below:

| COMPONENT | MOLE PERCENT |
| --- | --- |
| $SiO_2$ | 75–85 |
| $AlPO_4$ | 1–10 |
| $TiO_2$ | 0–14 |
| $GeO_2$ | 0–10 |
| $ZrO_2$ | 0–5 |
| $CeO_2$ | 0–10 |

In the last-mentioned batch composition, the sum of $SiO_2$ and $AlPO_4$ totals at least 80.0 mole percent and at least four components are present in the composition.

According to the present invention, the glass batch compositions are finely divided or finely comminuted admixtures of particulate batch constituents and such batch compositions embrace a series of multi-component batch compositions containing one or more of such additives as boric oxide, germanium oxide, vanadium oxide, alumina, copper oxide, cadmium oxide and cerium oxide, such as represented by the following tabulations: the components being present in the indicated mole percent ranges based on the total glass batch composition:

| COMPONENT | MOLE PERCENT |
| --- | --- |
| $SiO_2$ | 75–85 |
| $AlPO_4$ | 1–10 |
| $TiO_2$ | 2.0–10 |
| $B_2O_3$ | 4–5 |
| $GeO_2$ | 0–10 |

In the foregoing, batch composition ranges 4.5 mole percent B₂O₃ and 5 mole percent GeO₂ are preferred.

| COMPONENT | MOLE PERCENT |
|---|---|
| $SiO_2$ | 75–85 |
| $AlPO_4$ | 1–10 |
| $TiO_2$ | 2–10 |
| $GeO_2$ | 0–10 |
| $Al_2O_3$ | 0–5 |
| $B_2O_3$ | 0–4.5 |
| $V_2O_3$ | 0–5 |

In the above range of glass batch compositions at least five components are present, and $V_2O_3$ and $B_2O_3$ are alternate components, e.g. when one is present the other is absent.

| COMPONENT | MOLE PERCENT |
|---|---|
| $SiO_2$ | 73–85 |
| $AlPO_4$ | 5–10 |
| $TiO_2$ | 6–10 |
| $CuO$ | 3–10 |
| $B_2O_3$ | 0–4.5 |
| $V_2O_5$ | 0–2.25 |
| $SiO_2$ | 75–82 |
| $AlPO_4$ | 6.5–10 |
| $TiO_2$ | 5–6 |
| $CdO$ | 1–10 |
| $B_2O_3$ | 0–4.5 |

In Example I that follows, the starting materials are representative of those in preparing the glass batch compositions shown in the tables below. The procedures used were generally the same.

EXAMPLE I

| Mole % | | Weight % | Weight | |
|---|---|---|---|---|
| 82 | $SiO_2$ | 73.55 | 14.71 g | Kona Quartz |
| 5 | $GeO_2$ | 7.81 | 1.56 g | Eagle-Picher Electronic grade |
| 5 | $AlPO_4$ | 9.10 | 1.82 g | Fischer Reagent |
| 8 | $TiO_2$ | 9.54 | 1.91 g | Baker Reagent |

A finely powdered glass batch was prepared by mixing and grinding the batch components together in an alumina mortar. Melting was carried out in a platinum crucible placed in a furnace at a temperature of 1600°C. After about 18 hours the crucible was removed and the batch composition was observed to be melted.

The Kona quartz had the following analysis:

| $Al_2O_3$ | 0.040 |
|---|---|
| $Fe_2O_3$ | 0.0034 |
| $Na_2O$ | 0.013 |
| $K_2O$ | 0.0098 |
| $TiO_2$ | 0.001 |
| $SiO_2$ | Balance |

Eagle-Picher Electronic grade germanium dioxide was reported to be 99.99% germania.

According to the manufacturer, the Baker Reagent titania contains:

| Water soluble salts | 0.05% |
|---|---|
| Arsenic (As) | 0.0001% |
| Iron (Fe) | 0.010% |
| Lead (Pb) | 0.010% |
| Zinc (Zn) | 0.010% |

The $AlPO_4$ is supplied as $AlPO_4 \cdot nH_2O$ and the water is driven off by heating.

The following Tables include representative illustrative examples of glass batch compositions within the purview of the present invention and are not to be considered limiting thereof in any way. All values are in mole percent based on the total glass batch composition.

TABLE I

| $\alpha \times 10^7$ | $SiO_2$ | $AlPO_4$ | $TiO_2$ | $GeO_2$ | $P_2O_5$ | $B_2O_3$ | $ZrO_2$ | $CeO_2$ | |
|---|---|---|---|---|---|---|---|---|---|
| 7.9 | 80.0 | 10.0 | 10.0 | | | | | | |
| 14.4 | 80.0 | 5.0 | 10.0 | | 2.5 | 2.5 | | | |
| | 80.0 | 8.0 | 4.0 | | 4.0 | 4.0 | | | |
| | 80.0 | 10.0 | | | 5.0 | 5.0 | | | |
| 5.5 | 80.0 | 5.0 | 10.0 | 5.0 | | | | | |
| 6.1 | 82.0 | 5.0 | 8.0 | 5.0 | | | | | |
| 5.9 | 78.0 | 5.0 | 12.0 | 5.0 | | | | | |
| 8.4 | 76.0 | 5.0 | 14.0 | 5.0 | | | | | |
| | | | | | | | | | $Na_2O$ |
| 17.4 | 78.43 | 4.90 | 9.80 | 4.90 | | | | | 1.96 |
| | | | | | | | | | $BaO$ |
| | 78.43 | 4.90 | 9.80 | 4.90 | | | | | 1.96 |
| | 78.0 | 5.0 | 10.0 | 5.0 | | 2.0 | | | |
| | 80.0 | 5.0 | 8.0 | 5.0 | | 2.0 | | | |
| 12.6 | 80.0 | 5.0 | 5.0 | 5.0 | | 5.0 | | | |
| | 85.0 | 5.0 | | 5.0 | | 5.0 | | | |
| | 80.0 | 10.0 | | 5.0 | | 5.0 | | | |
| | 80.0 | 5.0 | 5.0 | 5.0 | | | 5.0 | | |
| | 80.0 | 5.0 | | 5.0 | | | 10.0 | | |
| | 80.0 | 5.0 | 10.0 | | | | 5.0 | | |
| | 79.0 | 5.0 | 10.0 | 5.0 | | | 1.0 | | |
| | 75.0 | 5.0 | 10.0 | 5.0 | | | 5.0 | | |

TABLE II

| $SiO_2$ | $AlPO_4$ | $TiO_2$ | $GeO_2$ | $P_2O_5$ | $B_2O_3$ | $V_2O_5$ | |
|---|---|---|---|---|---|---|---|
| | | | | | | | $NH_4F$ |
| 66.67 | 4.17 | 8.33 | 4.17 | | | | 16.67 |
| 79.0 | 5.0 | 11.0 | 5.0 | | | | |

TABLE II-continued

| SiO₂ | AlPO₄ | TiO₂ | GeO₂ | P₂O₅ | B₂O₃ | V₂O₅ | | |
|---|---|---|---|---|---|---|---|---|
| | | | | | | | BN | |
| 79.0 | 5.0 | 10.0 | 5.0 | | | | 1.0 | |
| 75.0 | 5.0 | 10.0 | 5.0 | | | | 5.0 | |
| | | | | | | | | La₂O₃ |
| 79.0 | 5.0 | 10.0 | 5.0 | | | | | 1.0 |
| | | | | | | | WO₃ | |
| 80.0 | 5.0 | 8.0 | 5.0 | | | | 2.0 | |
| 80.0 | 5.0 | 5.0 | 5.0 | | | | 5.0 | |
| | | | | | | | Dy₂O₃ | |
| 79.0 | 5.0 | 10.0 | 5.0 | | | | 1.0 | |
| | | | | | | | | Sm₂O₃ |
| 79.0 | 5.0 | 10.0 | 5.0 | | | | | 1.0 |
| | | | | | | | Tb₂O₃ | |
| 79.0 | 5.0 | 10.0 | 5.0 | | | | 1.0 | |
| | | | | | | | Sb₂O₃ | |
| 75.0 | 5.0 | 10.0 | 5.0 | | | 2.5 | 2.5 | |
| | | | | | | | | Al₂O₃ |
| 75.0 | 5.0 | 10.0 | 5.0 | | 2.5 | | | 2.5 |
| 75.0 | 5.0 | 10.0 | 5.0 | | 5.0 | | | |
| 80.0 | 5.0 | 5.0 | 5.0 | | 5.0 | | | |
| | | | | | | | | Al₂O₃ |
| 75.0 | 5.0 | 10.0 | | | 5.0 | | | 5.0 |
| | | | | | | | Sb₂O₃ | |
| 75.0 | 5.0 | 10.0 | | | 5.0 | | 5.0 | |
| 87.0 | 6.5 | 2.0 | | 4.5 | | | | |
| 85.0 | 6.5 | 4.0 | | 4.5 | | | | |
| 83.0 | 6.5 | 6.0 | | 4.5 | | | | |
| 78.0 | 6.5 | 6.0 | 5.0 | 4.5 | | | | |
| | | | | | | | CdO | |
| 75.0 | 10.0 | 5.0 | | | | | 10.0 | |
| 82.0 | 6.5 | 6.0 | | 4.5 | | | 1.0 | |
| 80.0 | 6.5 | 6.0 | | 4.5 | | | 3.0 | |

TABLE III

| SiO₂ | AlPO₄ | TiO₂ | B₂O₃ | V₂O₅ | CuO |
|---|---|---|---|---|---|
| 83.0 | 6.5 | 6.0 | 2.25 | 2.25 | |
| 80.0 | 6.5 | 6.0 | 4.5 | | 3.0 |
| 80.0 | 6.5 | 6.0 | 2.25 | 2.25 | 3.0 |
| 82.0 | 5.0 | 10.0 | | | 3.0 |
| 78.0 | 6.5 | 6.0 | 4.5 | | 5.0 |
| 78.0 | 6.5 | 6.0 | 2.25 | 2.25 | 5.0 |
| 73.0 | 6.5 | 6.0 | 4.5 | | 10.0 |
| 74.0 | 10.0 | 6.0 | | | 10.0 |

In the above experimental runs, representative 100 gram, finely divided samples of the glass batch compositions were placed in platinum-rhodium crucibles in an electric furnace and heated for about 16 hours.

Small amounts of other constituents such as alkali and alkaline earths, rare earths, transition metals and the like may be added to the compositions of the present invention providing no deleterious effects result therefrom. Impurites may also enter the compositions, depending on the source of the starting materials. Such variations in the compositions are intended, of course, to be included within the spirit and scope of the invention.

In the foregoing compositions and in the claims appended hereto the mole percents of the various batch constituents are calculated on the basis of the extent of the purity of the raw batch materials.

Throughout the foregoing description of the present invention all references to "batch" compositions is intended to mean admixture compositions containing discrete particles of the various individual components or constituents.

I claim:

1. A glass batch composition for producing a glass having a linear coefficient of thermal expansion of from about $4 \times 10^{-7}$ to about $20 \times 10^{-7}$ over the temperature range of from 0°–300°C., said glass batch composition consisting essentially of an admixture of the following components in the indicated ranges of mole percents of the total composition:

| Component | Mole Percent Range |
|---|---|
| SiO₂ | 70–87 |
| AlPO₄ | 5.0–10.0 |
| TiO₂ | 2.0–10.0. |

2. A glass batch composition for producing a glass having a linear coefficient of thermal expansion within the range of from about $4 \times 10^{-7}$ to about $20 \times 10^{-7}$ over the temperature range of from 0°–300°C., said glass batch composition consisting essentially of an admixture of the following components in the indicated ranges of mole percents of the total batch composition:

| Component | Mole Percent Range |
|---|---|
| SiO₂ | 70–87 |
| AlPO₄ | 1.0–10 |
| TiO₂ | 4–14 |
| GeO₂ | up to 10. |

3. A glass batch composition as defined in claim 2, wherein the SiO₂ and AlPO₄ together total at least 80.0 mole percent of the glass batch composition.

4. A glass batch composition as defined in claim 2, wherein said glass batch composition consists essentially of:

| Component | Mole Percent Range |
|---|---|
| SiO₂ | 75–85 |

| Component | Mole Percent Range |
|---|---|
| $AlPO_4$ | 4.9–10 |
| $TiO_2$ | 5–14 |
| $GeO_2$ | 1–10. |

5. A glass batch composition for producing a glass having a low to medium linear coefficient of thermal expansion in the temperature range of from 0°–300°C., said glass batch composition consisting essentially of 75–85 mole percent $SiO_2$, 4.9–10 mole percent $AlPO_4$, 5–10 mole percent $TiO_2$, together with at least one compatible glass batch component selected from the following group in an amount within the indicated range of mole percent amounts of the total glass batch composition:

| Component | Mole Percent Range |
|---|---|
| $P_2O_5$ | 0–5 |
| $B_2O_3$ | 0–5. |

6. A glass batch composition as defined in claim 5, wherein the $P_2O_5$ and $B_2O_3$ components rspectively constitute at least 2.5 mole percent of the total glass batch composition.

7. A glass batch composition for producing a glass having a linear coefficient of thermal expansion within the range of from about $4 \times 10^{-7}$ to about $20 \times 10^{-7}$ over the temperature range of from 0°–300°C., said glass batch composition consisting essentially of an admixture of the following components in the indicated ranges of mole percents of the total batch composition:

| Component | Mole Percent Range |
|---|---|
| $SiO_2$ | 75–80 |
| $AlPO_4$ | 1–10 |
| $TiO_2$ | 0–10 |
| $B_2O_3$ | 2.5–5 |
| $P_2O_5$ | 2.5–5. |

8. A glass batch composition for producing a glass having a low to medium linear coefficient of thermal expansion in the temperature range of from 0°–300°C., said glass batch composition consisting essentially of the following components in the indicated ranges of mole percent amounts of the total glass batch composition:

| Component | Mole Percent Range |
|---|---|
| $SiO_2$ | 75–85 |
| $AlPO_4$ | 1–10 |
| $TiO_2$ | 2–10 |
| $B_2O_3$ | 4–5 |
| $GeO_2$ | 0–10. |

9. A glass batch composition as defined in claim 8, wherein $B_2O_3$ constitutes about 4.5 mole percent and $GeO_2$ constitutes about 5 mole percent.

10. A glass batch composition for producing a glass having a low to medium linear coefficient of thermal expansion in the temperature range of from 0°–300°C., said glass batch composition consisting essentially of 75–85 mole percent $SiO_2$, 1–10 mole percent $AlPO_4$, 2–10 mole percent $TiO_2$, together with at least two glass batch components selected from the following group of components in an amount within the indicated mole percent range of the total glass batch composition:

| Component | Mole Percent Range |
|---|---|
| $GeO_2$ | 0–10 |
| $Al_2O_3$ | 0–5 |
| $B_2O_3$ | 0–4.5. |

11. A glass batch composition for producing a glass having a low to medium linear coefficient of thermal expansion in the temperature range of from 0°–300°C., said glass batch composition consisting essentially of 75–85 mole percent $SiO_2$, 1–10 mole percent $AlPO_4$, 2–10 mole percent $TiO_2$, together with at least two glass batch components selected from the following group of components in an amount within the inicated mole percent range of the total glass batch composition:

| Component | Mole Percent Range |
|---|---|
| $GeO_2$ | 0–10 |
| $Al_2O_3$ | 0–5 |
| $V_2O_3$ | 0–5. |

12. A glass batch composition for producing a glass having a linear coefficient of thermal expansion within the range of from about $4 \times 10^{-7}$ to about $20 \times 10^{-7}$ over the temperature range of from 0°–300°C., said glass batch composition consisting essentially of an admixture of the following components in the indicated ranges of mole percents of the total batch composition:

| Component | Mole Percent Range |
|---|---|
| $SiO_2$ | 73–85 |
| $AlPO_4$ | 5–10 |
| $TiO_2$ | 6–10 |
| $CuO$ | 3–10 |
| $B_2O_3$ | 0.–4.5 |
| $V_2O_5$ | 0–2.25. |

13. A glass batch composition for producing a glass having a linear coefficient of thermal expansion within the range of from about $4 \times 10^{-7}$ to about $20 \times 10^{-7}$ over the temperature range of from 0°–300°C., said glass batch composition consisting essentially of an admixture of the following components in the indicated ranges of mole percents of the total composition:

| Component | Mole Percent Range |
|---|---|
| $SiO_2$ | 75–82 |
| $AlPO_4$ | 6.5–10. |
| $TiO_2$ | 5–6 |
| $CdO$ | 1–10 |
| $B_2O_3$ | 0–4.5. |

* * * * *